United States Patent
Papke

[15] 3,675,552
[45] July 11, 1972

[54] CAMERA WITH ADJUSTMENT-INDICATING LOCATION

[72] Inventor: Friedrich Papke, Braunschweig, Germany
[73] Assignee: Voigtlander Aktiengesellschaft, Braunsweig, Germany
[22] Filed: Sept. 22, 1969
[21] Appl. No.: 859,681

[30] Foreign Application Priority Data

July 1, 1969 Germany .................... P 19 33 260.6

[52] U.S. Cl. ........................................... 95/11 V, 88/1.5 R
[51] Int. Cl. .................................................. G03b 17/20
[58] Field of Search .................. 95/11 R, 11 L, 11 V, 42 R, 95/44 R; 88/1.5 R

[56] References Cited

UNITED STATES PATENTS

| | | | |
|---|---|---|---|
| 3,041,919 | 7/1962 | Baur et al. | 88/1.5 X |
| 3,250,196 | 5/1966 | Ort et al. | 95/44 |
| 3,387,530 | 6/1968 | Ebertz | 95/42 X |
| 3,433,141 | 3/1969 | Ruhle et al. | 95/11 |
| 3,259,043 | 7/1966 | Pagel | 95/11 R X |

Primary Examiner—Samuel S. Matthews
Assistant Examiner—Fred L. Braun
Attorney—Blum, Moscovitz, Friedman & Kaplan

[57] ABSTRACT

A camera which is provided in the region of its viewfinder with a location where an indication of the adjustment of the camera can be read. For this purpose the camera is provided with a light-conducting body having a light-receiving surface to receive light from the exterior of the camera and a light-discharging surface from which light moves beyond this body to be seen by the operator. This light-discharging surface of the light-conducting body has a configuration which enables it to form in itself the structure for indicating the adjustment of the camera.

3 Claims, 6 Drawing Figures

PATENTED JUL 11 1972 3,675,552

CAMERA WITH ADJUSTMENT-INDICATING LOCATION

BACKGROUND OF THE INVENTION

The invention relates to cameras.

In particular, the present invention relates to cameras provided with structure for indicating the adjustment of the camera, so that in this way it is known when the camera is properly adjusted to make a proper exposure.

For such purposes it is already known to provide a light-conducting body having its light-receiving surface situated at that part of a shutter or objective housing where the scale thereof is located so that this scale can be rendered visible in the interior of or at the region of the image of the viewfinder. For this purpose, adjustment indication such as marks, scales, or the like are rendered visible in or in the region of the viewfinder image. However, with conventional constructions it is very often exceeding difficult to render such indications easily visible because in their brightness and contrast they differ if at all only to a small extent from the viewfinder image field. In fact, sometimes these indications are darker than the viewfinder image so that it is exceedingly difficult to see the indications.

SUMMARY OF THE INVENTION

It is accordingly a primary object of the present invention to provide a construction which will avoid the above drawbacks.

In particular, it is an object of the invention to provide an exceedingly simple structure which will enable the indication to be provided in a manner which contrasts very sharply with the image of the viewfinder.

In particular, it is an object of the invention to provide an exceedingly bright indication of the adjustment of the camera so that this indication can be readily seen by the operator.

In accordance with the invention, a light-conducting body is provided with a light-receiving surface and a light-discharging surface, and this latter surface is located at the region where the indication of the adjustment of the camera is to be read. The light-discharging surface of the light-conducting body has a configuration which enables it to form the indication of the adjustment of the camera.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
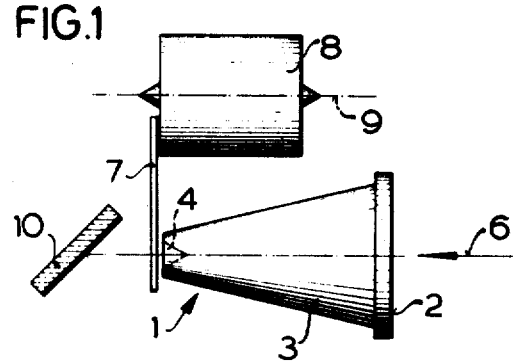
FIG. 1 is a schematic side elevation of a light-conductive body coacting with the pointer of a light meter.
Figure 2:
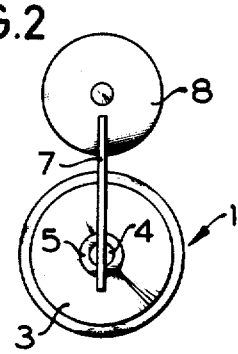
FIG. 2 is an end view of the structure of FIG. 1 as seen from the left thereof between the pointer and reflector shown at the left of FIG. 1.

Referring now to FIGS. 1 and 2, a light conductive body 1 is illustrated therein. This body is made of a transparent plastic which can be pressed in a suitable die, for example, so as to have the configuration shown in FIGS. 1 and 2. This light-conductive body 1 is provided with a light-receiving surface 2, and from the latter the body tapers toward the left so as to have the frustoconical portion 3. This portion terminates at its left end, as viewed in FIG. 1, in a flat end surface forming the light-discharging surface of the light-conducting body. At this left end surface of the body 3 is formed with a conical depression 4.

As is particularly apparent from FIG. 2, the outer end of the depression 4 is in the form of a circular edge which is concentrically arranged within the outer peripheral edge at the left end of the tapered portion 3, so that in this way an annular circular area 5 of a given width is achieved. Thus, it is through this circular area 5 that the light will discharge.

The depression 4 and the outer side surface of the tapered portion 3 can be covered with an opaque coating which, for example, may have a light-reflecting surface directed toward the interior of the body 3 or which may simply take the form of a lacquer coating. Thus, the light which enters from the exterior as indicated by the arrow 6 will discharge through the circular area 5 which forms the indicating structure for indicating the adjustment of the camera.

For this purpose a pointer 7 of an electric light meter extends across the surface 5. This light meter has a rotary moving coil 8 which is schematically indicated in FIGS. 1 and 2. The pointer 7 is fixed to the rotary coil 8 to turn therewith and the rotary coil 8 has a turning axis 9 indicated in dot-dash lines in FIG. 1.

When the camera has been properly adjusted the pointer 7 will assume with respect to the circular area 5 the position shown in FIG. 2. Thus, when the parts of the camera have been adjusted to provide a proper exposure in accordance with the prevailing lighting conditions, the position of the pointer 7 shown in FIG. 2 can be made visible to the operator with respect to the circular discharge surface area 5 which itself forms the indicating means for indicating that the camera has been properly adjusted.

It is possible to render the pointer 7 and the indication adjusting surface 5 directly visible in the viewfinder or an image thereof can be directed to the viewfinder to be rendered visible therein. For this latter purpose a reflector 10 may be used.

The tapered configuration of the portion 3 results in a concentration of the light which discharges through the surface 5 so that in this way this surface 5 is rendered substantially brighter than the image field of the viewfinder in which the surface 5 is rendered visible. The brightness can be increased by using the above-mentioned coatings at the exterior side surface of portion 3 and at the surface of the depression 4. This construction of FIGS. 1 and 2 can be incorporated into viewfinders of any type, such as, for example, either a viewfinder through which the operator looks directly at the object or in a reflex viewfinder.

Figure 3:
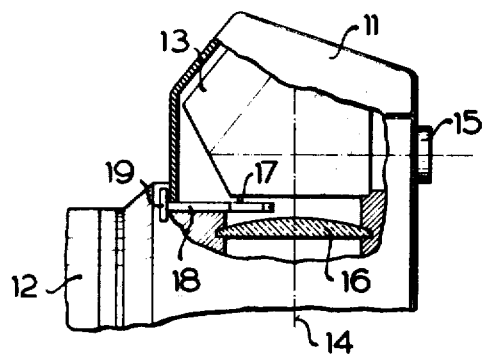
FIG. 3 shows in a schematic partly sectional fragmentary side view of another embodiment of the invention as used in a single lens reflex camera.
Figure 4:
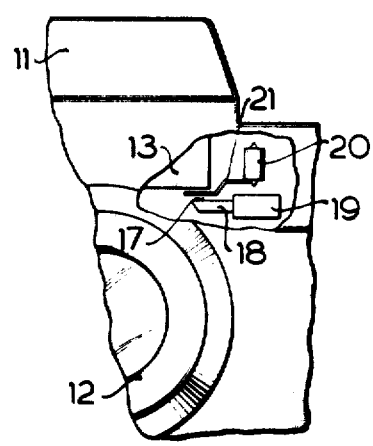
FIG. 4 is a fragmentary front elevation of the structure of FIG. 3.

Referring to FIGS. 3 and 4, the single lens reflex camera 11 illustrated therein has an objective 12 and an upper cap or enclosure in which the finder prism 13 is situated. The dot-dash line 14 indicates the path taken by the finder light rays. The viewfinder has an ocular 15 through which the operator can look into the interior of the viewfinder.

In the space between the prism 13 and the image field lens 16 there is situated the light-discharging surface 17 of a light-conducting body 18 of this embodiment. This body 18 has the light-receiving surface 19 which is situated at the front wall of the camera 11 to receive light from the exterior.

As may be seen from FIG. 4, within the upper cap of the camera there is also a measuring mechanism of an electric light meter which has the moving coil 20. A pointer 21 is fixed to the moving coil 20 for rotary movement therewith and extends to a location over the light-discharging surface 17 of the light-conducting body 18. The pointer 21 and the light-discharging surface 17 are situated, as indicated, at an edge region of the image field of the viewfinder, and of course the light-discharging surface 17 and the part of the pointer 21 located thereover are both visible through the ocular 15.

Figure 5:
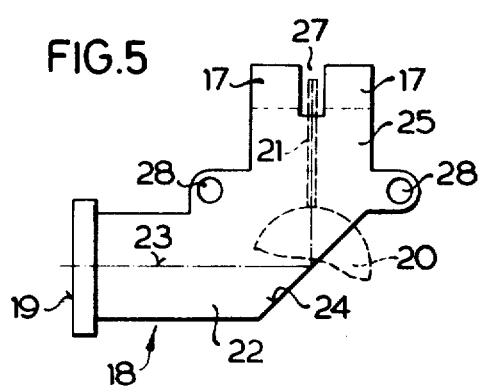
FIG. 5 is a top plan view showing in detail and at an enlarged scale the light-conducting body used in FIGS. 3 and 4.
Figure 6:
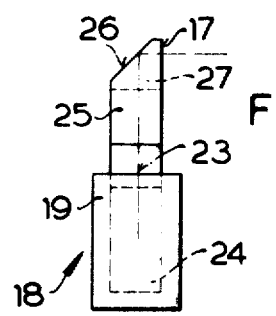
FIG. 6 is an end view of the structure of FIG. 5 as seen from the left of FIG. 5.

The details of the light-conductive body 18 are illustrated in FIGS. 5 and 6. Thus it will be seen that the light-receiving surface 19 joins a portion 22 which is of a relatively small cross-sectional rectangular configuration. The central axis 23 of the light ray path through the body 18 is indicated by a dot-dash line. Thus, this light will reach the inclined surface 24 which is totally reflecting and which changes the direction of travel of the light so that it will now flow through the part 25 of the body 18. The light will in this way reach the inclined surfaces 26 which again change the direction of the light so that it travels out through the light-discharging surface 17 of the body 18. These surfaces 26 also are totally reflecting. Thus, the light-discharging surface area 17 forms with the light-deflecting surfaces 26 an indication of the adjustment by reason of the fact that the body 18 is provided at this location with a cutout forming the gap 27 which interrupts not only the surface 17 but also the totally light-reflecting surface 26.

The exterior light which thus reaches the interior of the body 18 is directed out through the surface 17 after being reflected twice. In contrast, the finder light ray path 14 is reflected a greater number of times and also passes through several glass-air surfaces so that the light rays which travel along the path 14 suffer a greater light loss. As a result, the light which discharges from the surface 17 is considerably brighter than the light which transmits the viewfinder image. Therefore, when the operator looks through the ocular into the viewfinder, he will see at the edge of the image therein a bright location where the rectangular areas defining the surface 17 are visible with the gap 27 situated therebetween. In the gap 27 the part of the viewfinder image which is seen through will be considerably darker than the light emerging from the areas which form the field 17. In this region 17, 27 is situated the pointer 21 of the light meter. After the camera has been properly adjusted, the pointer 21 will be in the region of the gap 27, so that when the parts have the position indicated in FIG. 5 the operator knows that the camera has been properly adjusted to provide a proper exposure for the prevailing lighting conditions.

The light-conducting body can also be made of one piece in the form of a plastic component which is pressed in a suitable press so as to have the configuration shown in FIGS. 5 and 6.

In addition, the body 18 is provided with lugs through which openings 28 extend. In this way these openings can accommodate screws or the like enabling the body 18 to be fixed to the camera.

At the inclined light-deflecting surfaces 24 and 26 it is possible to provide reflecting layers. It will be noted that with both embodiments of the invention there is a means for rendering an image of the light-discharging surface visible through the ocular 15 of the viewfinder. In the case of FIGS. 1 and 2 this means is formed by the reflector 10, whereas in the case of FIGS. 3-6 this means is formed by the structure which supports the body 18. Thus, with both embodiments of the invention the operator when looking through the ocular will see an image of the light-discharging surface. In the case of FIGS. 1 and 2 an image of the annular surface 5 will be seen whereas in the case of FIGS. 3-6 an image of the surface areas 17 will be seen. In both cases these images form at least part of an indication of the adjustment of the camera in that in both cases each image acts as an index cooperating with the pointer of the meter for indicating the position of the pointer.

What is claimed is:

1. In an adjustable camera having a viewfinder provided with an ocular, a light-conducting body having a light-receiving surface for receiving exterior light and a light-discharging surface from which the light travels from said body, said body being formed in a frustoconical configuration having a large end forming said light-receiving surface and a small end forming said light-discharging surface, said small end being annularly shaped, said body being formed at said small end with an indentation defining the inner edge of said annular light-discharging surface; a pointer movable with respect to said light-discharging surface so that the relative position of said pointer and said annular light-discharging surface indicates the position of said pointer to provide at least part of an indication of the adjustment of the camera; and means coacting with said body for rendering an image of said light-discharging surface visible through said ocular.

2. The combination of claim 1 and wherein aid body is covered at its exterior surface between said end surfaces and at said indentation with a coating which prevents light from entering or leaving through said coating and which reflects light into the interior of said body.

3. In an adjustable camera having a viewfinder provided with an ocular, a light-conducting body having a light-receiving surface for receiving exterior light and a light-discharging surface from which the light travels beyond said body, said body being formed with a pair of spaced rectangular areas defining between themselves a gap and said light-discharging surface, said body being further formed with a notch defining said gap, and interior reflecting surfaces situated on opposite sides of said gap for reflecting light entering said body through said light-receiving surface through said rectangular areas defining said light-discharging surface of said body; and a pointer movable with respect to said light-discharging surface so that the relative position of said pointer and said light-discharging surface indicates the position of said pointer and provides at least part of an indication of the adjustment of the camera; and means coacting with said body for rendering an image of said light-discharging surface visible through said ocular.

* * * * *